United States Patent [19]
Oka et al.

[11] 3,819,204
[45] June 25, 1974

[54] SAFETY DEVICE FOR MOTOR VEHICLE

[75] Inventors: Takashi Oka, Tokyo; Tatsuhiro Arima; Akira Kimitsuka, both of Yokohama, all of Japan

[73] Assignee: Nissan Motor Company Limited, Kanagawa-ku, Yokohama City, Japan

[22] Filed: June 30, 1972

[21] Appl. No.: 268,209

[30] Foreign Application Priority Data
Oct. 26, 1971  Japan.............................. 46-98579

[52] U.S. Cl............................ 280/150 AB, 180/90
[51] Int. Cl............................................. B60r 21/08
[58] Field of Search ................ 280/150 AB; 180/90

[56] References Cited
UNITED STATES PATENTS

| | | |
|---|---|---|
| 2,860,003 | 11/1958 | Hodges................................ 296/84 |
| 3,425,712 | 2/1969 | Berryman..................... 280/150 AB |
| 3,439,769 | 4/1969 | Brilmyer.............................. 180/90 |
| 3,614,128 | 10/1971 | Sobkow........................ 280/150 AB |
| 3,642,303 | 2/1972 | Irish et al. ..................... 280/150 AB |
| 3,702,706 | 11/1972 | Sobkow........................ 280/150 AB |

Primary Examiner—David Schonberg
Assistant Examiner—Terrance L. Siemens

[57] ABSTRACT

A safety device for use in a motor vehicle for protecting a vehicle occupant from injury during a collision of the motor vehicle, which safety device comprises an instrument panel forming a part of the motor vehicle and deformable to absorb the energy of the vehicle occupant when the vehicle occupant impacts against the instrument panel during the collision of the motor vehicle, and an inflatable protector bag located on the instrument panel and expansible to its protective position to provide a restraint to limit forward movement of the head of the vehicle occupant.

1 Claim, 5 Drawing Figures

PATENTED JUN 25 1974 3,819,204

SAFETY DEVICE FOR MOTOR VEHICLE

The present invention relates in general to a safety device for a motor vehicle and more particularly to a safety device adapted for protecting a vehicle occupant or occupants from injury during a collision of the motor vehicle with an obstruction.

Heretofore, various provisions have been made to protect a vehicle occupant or occupants from serious injury in the event a motor vehicle encounters a collision during cruising. One of the typical expedients is to employ an inflatable protector bag which is located between the vehicle occupant and structual parts of the motor vehicle such as a windshield an instrument panel and a steering wheel whereby when the protector bag is inflated as a result of an impact or collision of the motor vehicle, the vehicle occupant is prevented from contacting the structual parts of the motor vehicle.

Such protector bag is usually stowed in a collapsed or folded condition and is ready to be instantaneously inflated to a protective position intervening between the vehicle occupant and the structual parts of the motor vehicle. The protector bag is inflated and projected to its protective position by blowing up the folded bag with a relatively highly pressurized gas which is supplied thereto immediately when the motor vehicle is involved in a collision.

In order to provide full assurance of safety of the vehicle occupant during the collision, it is necessary that the protector bag assumes the protective position within a time interval in which the vehicle occupant is moved by the force of inerita a certain appreciable distance after the collision condition is initially encountered by the motor vehicle. This is attained by sensing the collision condition of the motor vehicle as soon as possible so that the protector bag is caused to assume to its protective position before the vehicle occupant is flung the critical distance. Experiments have revealed that the distance of forward movement of the vehicle occupant as measured in the case of frontal collisions of the motor vehicles increases approximately in proportion to the square of the time which has lapsed after the collision condition has been initially encountered. If, therefore, the protector bag fails to reach its protective position before the vehicle occupant has moved the critical distance, the result will be that the vehicle occupant is caused to forcefully strike against the internal structure of the vehicle body and is accordingly injured seriously especially where the collision accompanies relatively rapid deceleration. It is, thus, absolutely important that the collision condition encountered by the motor vehicle be sensed as soon as possible thereby to enable the protector bag to assume its protective position before the vehicle occupant is flung the critical distance. The requirement for such rapid expansion of the protector bag can be met only by those arrangements which are designed and engineered with extremely sophisticated techniques and at high production costs.

The protector bag having a collision detecting device which is capable of responding to a deceleration of a relatively low degree is liable to be actuated to the protective position even in response to those shocks or relatively soft contacts of the motor vehicle with an obstruction which will not seriously hurt the vehicle occupant as experienced during parking or garaging. On such occasions, the protector bag not only restrains the vehicle occupant but obstructs the frontal viewing of the vehicle occupant and, if the driver is caught by the protector bag thus serving as the restraint, then he is no longer able to properly steer the motor vehicle. In the case of the protector bag, moreover, the pressure of air in the vehicle cabin is increased instantaneously by the inflation of the protector bag and consequently the occupant's eardrums and lungs are injured by such increased pressure as well as by the sound acompanying the inflation of the protector bag and the blasting of an explosive charge which is usually used to open the container of the pressurized gas.

Another typical expedient is to have the structural parts of the motor vehicle equipped with a member to absorb the energy of the impact of the vehicle occupant on the structural parts. Such energy absorbing member should be mounted on the structural parts of the motor vehicle at a location wherein it does not impede the frontal viewing of the vehicle occupant so that the driver can steer the motor vehicle properly to avoid the fatal danger. Another disadvantage encountered in this prior art is that it is impossible to provide an adequate protection to a head portion of the vehicle occupant.

The present invention contemplates resolution of all of these drawbacks which have been inherent in the prior art safety devices by providing an instrument panel which is readily deformable in a horizontal direction to absorb the impact energy of the vehicle occupant on his chest or abdominal portion in combination with an inflatable protector bag adapted to provide a protection mainly for the head portion of the vehicle occupant which protector bag is located above the instrument panel.

It is, therefore, an object of the present invention to provide a new and improved safety device for protecting an occupant or occupants of a motor vehicle from injury during a collision of the motor vehicle with an obstruction which safety device avoids by extremely simple and operationally reliable means the aforementioned shortcomings and drawbacks encountered in the prior arts.

Another object of the present invention is to provide a new and improved safety device adapted for protecting the heads of vehicle occupants in highly reliable manner without obstructing the driver's frontal viewing and preventing the driver from properly maneuver the motor vehicle during a collision.

A still another object of the present invention is to provide a new and improved safety device adapted for enhancing the safety of vehicle occupants sitting in front seats of a motor vehicle which safety device is capable of significantly reducing the impact in case of accidents.

A yet another object of the present invention is to provide a new and improved safety device for use in a passenger motor vehicle which safety device is adapted to reliably protect the heads of vehicle occupants against impact injuries in case of collision accidents.

A further object of the present invention is to provide a new and improved safety device for use in a passenger motor vehicle which safety device not only assures that a vehicle occupant remains seated in case of accidents but additionaly assures that no head injuries occur as a result of impact by the heads of the vehicle occupants against the inner walls of the passenger space.

A still further object of the present invention is to provide a new and improved safety device for use in a passenger motor vehicle under normal driving conditions, does not impair the capacity of the vehicle occupants to more and act freely in the customary manner.

A still further object of the present invention is to provide a new and improved safety device for use in a passenger motor vehicle which is simple in construction, can be readily installed into new as well as existing motor vehicles and can be adapted to the particular type of vehicle used without any great difficulty.

According to the present invention, the safety device includes an instrument panel which forms a part of a motor vehicle in which the safety device is mounted and which extends laterally toward the chest portion of a vehicle occupant. The instrument panel may consist of deformable pleated walls made of sheet metal. The safety device also includes an inflatable protector bag which is located on the upper wall of the instrument panel and which is arranged to be expansible in a V-shaped portion defined between a front glass of the motor vehicle and the upper wall of the instrument panel to a protective position for restraining the head of the vehicle occupant sitting on a seat of the motor vehicle during a collision condition of the motor vehicle with an obstruction. The inflatable protector bag is connected to a pressurized gas generator which may be opened to supply a gas under pressure to the inflatable protector bag in response to the vehicle encountering the collision condition. The inflatable protector bag is received within a casing which is rigidly constructed and which is disposed between the end of the instrument panel and the body of the motor vehicle, the casing constituting the mounting base for the instrument panel and preventing the pressurized gas generator from being deformed when the instrument panel is deformed in response to the vehicle encountering the collision condition.

These and other features and advantages of the present invention will be more apparent to those skilled in the art from the following description when taken in conjunction with the accompanying drawings wherein same reference numerals are used to designate like or corresponding component parts and, in which.

Figure 1:
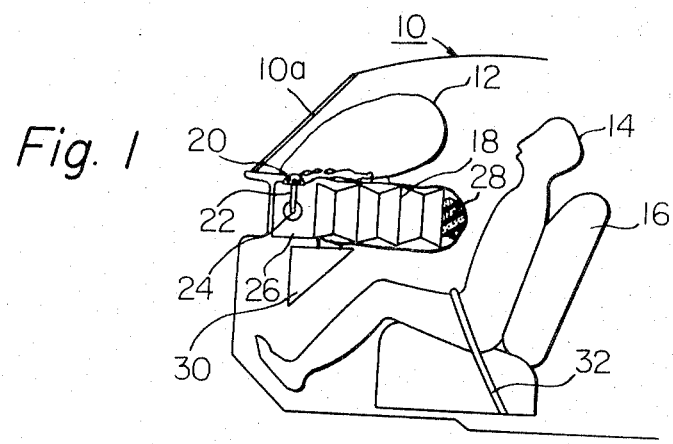
FIG. 1 is a partial schematic elevational view on the left-hand side of a passenger compartment of a motor vehicle and showing a novel safety device of the present invention embodied therein.

The novel safety device of the present invention may be employed in various kinds or types of vehicles, and for purposes of illustration is herein shown and described as being used in a passenger motor vehicle 10.

The safety device of the present invention largely comprises an inflatable confinement or protector bag 12 which is mounted on an interior part of the motor vehicle 10 and which is inflatable to its protective position to provide a restraint to limit forward movement of the head of an occupant 14 sitting on a front seat 16 mounted on a floor panel of during a collision condition of the motor vehicle, and a deformable instrument panel 18 laterally extending toward the vehicle occupant 14 sitting in the front seat 16 to provide a cushion for absorbing any impacting force of the vehicle occupant 14 against the instrument panel 18.

The inflatable protector bag 12 is located on the instrument panel 18 and is normally held in a collapsed or folded position. THe protector bag 12 is so sized as to be small enough to prevent obstruction of the frontal viewing of the vehicle occupant 14 but to to provide an adequate protection to the head portion of the vehicle occupant 14 14 when it is inflatable to its protective position. This protector bag 12 has a diffusing nozzle 20 which is connected through a conduit 22 to a pressurized gas container 24 which contains therein a gas under pressure or liquefied gas which is ready for conversion into a gas under pressure. The pressurized gas container 24 may be of any known construction insofar as it is operable to supply the gas under pressure to the inflatable protector bag 12 to cause the same to move towards the front portion of the front seat 16 to restrain the head of the vehicle occupant 14 sitting in the front seat 16 when a collision occurs. This pressurized gas container 24 is electrically connected to and actuated by a collision sensing means (not shown).

Indicated at reference numeral 26 is a magazine or casing for receiving the pressurized gas container 24, the casing 26 constituting the mounting base for the deformable instrument panel 18. This casing 26 is rigidly constructed so as to prevent the pressurized gas container 24 from being deformed.

Figure 4:
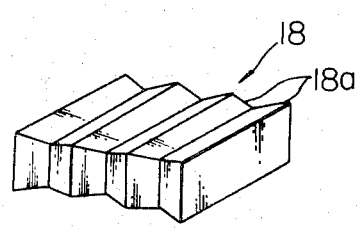
FIG. 4 is a schematic perspective view of an instrument panel forming part of the safety device shown in FIGS. 1, 2 and 3.
Figure 5:
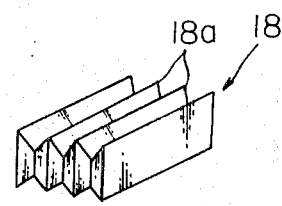
FIG. 5 is a view similar to FIG. 4 but shows the instrument panel in a deformed condition during collision condition of the motor vehicle.

The instrument panel 18 comprises deformable pleated side walls 18a which are made of any suitable material such as sheet metal, and is shaped in bellows form as seen from FIG. 4 so that the instrument panel 18 can be deformed in a length of about 200 – 250mm as seen in FIG. 5. This instrument panel 18 serves to receive the chest portion of the vehicle occupant during a collision of the motor vehicle for thereby preventing the vehicle occupant from serious injury.

The safety device also includes a resilient cushion or padding means 28 which is secured or bonded to the end portion of the instrument panel 18 for preventing injuries to the vehicle occupant 14 sitting in the front seat 16 when the vehicle occupant 14 is thrown against the instrument panel 18 during the collision condition of the motor vehicle. The cushioning means 28, which may be made of any suitable energy absorbing material, is herein shown as being generally semicircular in shape.

It will be appreciated that an auxiliary protecting means 30 is further provided which is connected to and associated with the deformable instrument panel 18 to be movable therewith for absorbing the energy of the knee portion of the vehicle occupant 14 thereby to prevent injury thereto during rapid deceleration of the motor vehicle. Moreover, a safety seat belt 32 may be provided which is secured to the floor panel or seat back portion for restraining the vehicle occupant from being thrown forward or injured when the motor vehicle undergoes an excessive deceleration.

Figure 2:
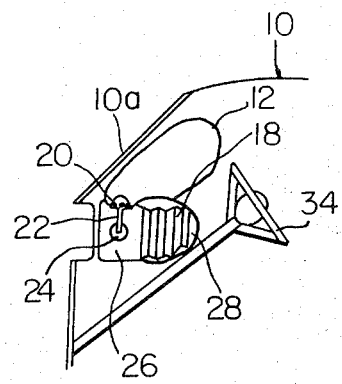
FIG. 2 is a partial schematic view, similar to FIG. 1, on the right hand side of a passenger compartment of a motor vehicle incorporating a novel safety device according to the present invention.

It should also be noted that since a steering wheel 34 will provide some shock absorbing effects, the overall length of the instrument panel 18 may be decreased to a certain extent as shown in FIG. 2, in the region of the steering wheel if desired.

Figure 3:
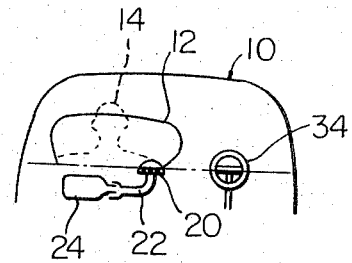
FIG. 3 is a partial schematic front view of a passenger compartment of a motor vehicle equipped with a novel safety device according to the present invention.

When a critical collision is occurring the collision sensing means (not shown) may be actuated to cause the pressurized gas generator to be opened to release the pressurized gas into the inflatable confinement 12. The inflatable confinement 12 when being inflated moves away from a front glass 10a toward the front side of the front seat 16. This inflatable confinement 12 when fully inflated, as shown in FIGS. 1, 2 and 3, provides a restraint the head portion of the vehicle occupant 14 sitting in the front seat 16 to prevent the vehicle occupant from being hurled at high velocity forwardly and thus, serve to protect and injury to the vehicle occupant. At the same time, if the vehicle ocupant 14 is moved forwardly by the force of inertia a certain distance after the collision condition is initially encountered by the motor vehicle, then the vehicle occupant 14 contacts the padding means 28 thereby causing the instrument panel 18 to be deformed. Thus, the impact force of the vehicle occupant is satisfactorily absorbed by the instrument panel 18 so that the vehicle occupant is prevented from injury during the collision.

It will now be understood from the foregoing description that the safety device implementing the present invention advantageously incorporates an instrument panel which is constructed to be deformable at the chest portion of the vehicle occupant thereby obviating the necessity of providing additional protecting means for the chest portion of the vehicle occupant. Moreover, the safety device of the present invention permits the use of a relatively small capacity inflatable protector bag for restraining the head portion of the vehicle occupant thereby eliminating the drawbacks encountered in the prior art safety devices. Since, for example, the inflatable protector bag employed in the safety device of the present invention is arranged to be inflatable in a V-shaped portion defined between the upper wall of the instrument panel 18 and the inner surface of the front glass 10a to provide a protection mainly for the head of the vehicle occupant, the bulk of the inflatable confinement can be decreased to a value of about 30 – 40l thereby reducing the increase in the pressure of air in the vehicle cabin as well as the sound accompanying the inflation of the protector bag and also assuring the frontal viewing the vehicle occupant.

What is claimed is:

1. In a safety device for use in a motor vehicle for protecting a vehicle occupant from injury during a collision of the motor vehicle, the combination comprising a deformable instrument panel forming a part of said motor vehicle, said instrument panel including a plurality of deformable pleated side walls and extending toward the chest portion of said vehicle occupant sitting on a seat of said motor vehicle, a padding means secured to an end portion of said instrument panel adjacent the occupant and, in conjunction with said deformable instrument panel, absorbing impact forces of said vehicle occupant thereby to prevent injury to said vehicle occupant, and an inflatable protector bag located on said instrument panel and inflatable to its protective position above said panel and providing a restraint to limit forward movement of the head of said vehicle occupant.

* * * * *